July 17, 1923.
B. F. SEYMOUR
1,462,385
COMBINED RESILIENT BEARING AND TRANSMISSION
Filed Dec. 3, 1919　　2 Sheets-Sheet 1
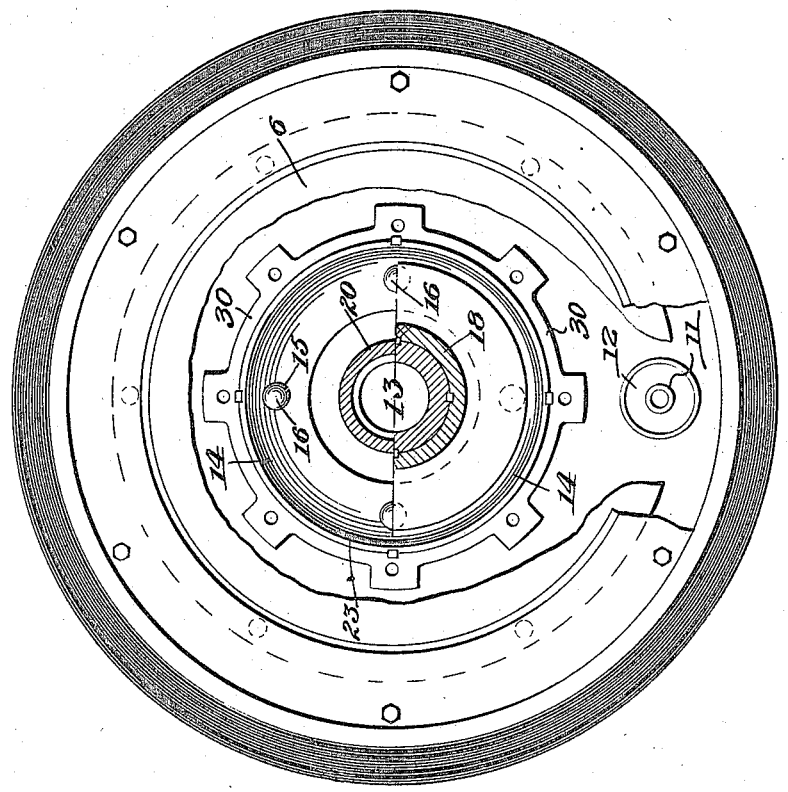
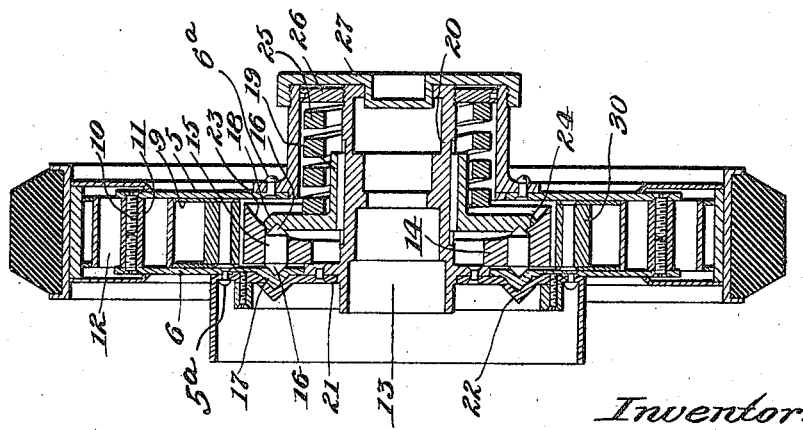
Inventor:
B. F. Seymour, July 17, 1923.

B. F. SEYMOUR 1,462,385

COMBINED RESILIENT BEARING AND TRANSMISSION

Filed Dec. 3, 1919 2 Sheets-Sheet 2

Inventor:
B. F. Seymour,

Patented July 17, 1923.

1,462,385

UNITED STATES PATENT OFFICE.

BENJAMIN F. SEYMOUR, OF WASHINGTON, DISTRICT OF COLUMBIA.

COMBINED RESILIENT BEARING AND TRANSMISSION.

Application filed December 3, 1919. Serial No. 342,285.

*To all whom it may concern:*

Be it known that I, BENJAMIN F. SEYMOUR, a citizen of the United States, residing at Washington, in the District of Columbia, have invented certain new and useful Improvements in Combined Resilient Bearings and Transmissions; and I do hereby declare the following to be a full, clear, and exact description of the invention, such as will enable others skilled in the art to which it appertains to make and use the same.

The present invention relates to resilient transmissions and bearings, more particularly for vehicle wheels, and consists in the combinations and arrangements of elements hereinafter described and particularly set forth in the accompanying claims.

The purpose of the invention is to provide a flexible or resilient transmission between a driving and a driven element adapted to positively transmit the driving force whether said elements are in or out of concentric relation; and one which will readily accommodate itself under all normal working conditions to which said elements may be subjected.

A further purpose of the invention is to provide a combined resilient transmission and bearing for a vehicle wheel to the end that such a wheel may possess the desired resilient qualities and also give the necessary transmission medium between the wheel proper and the motive power of the vehicle.

The construction shown herein is proposed as an improvement or other embodiment of the types of combined resilient transmission and bearing disclosed in my co-pending applications for United States patents bearing the Serial Nos. 302,415, 302,416, 310,970, 322,627, 330,374, 336,632, 342,283 and 342,284, and dated respectively June 7, 1919; June 7, 1919; July 15, 1919; Sept. 9, 1919; Oct. 13, 1919; Nov. 8, 1919; Dec. 3, 1919; and Dec. 3, 1919.

The arrangement shown herein is further characterized in that uniformly distributed and co-operable cone elements are provided for the driving and driven element to the end of obtaining equal and uniformly distributed pressure under all working conditions, whereby to obtain maximum efficiency and ease of operation.

Figure 4:
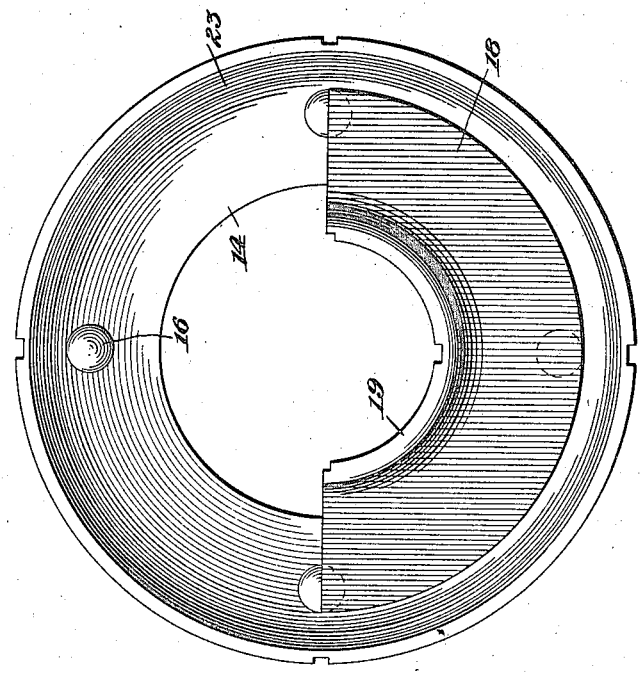
Figure 3:
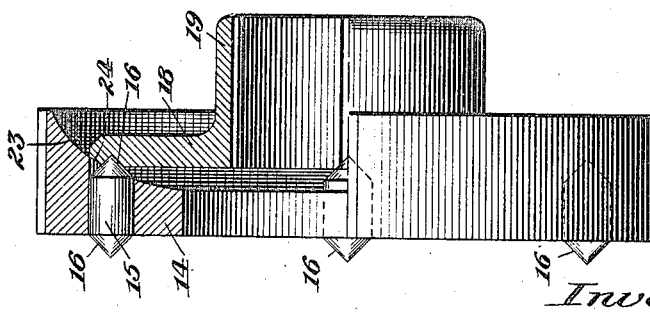

The invention is shown by way of illustration in the accompanying drawings wherein, Figure 1 is a central sectional view showing the application of the device to a vehicle wheel, Figure 2, a side elevational view thereof, Figure 3, an enlarged detail view, partly in section, of the transmitting and bearing elements per se, and Figure 4 is a similar view thereof taken at right angles to Figure 3.

Referring to the construction in further detail and wherein like reference characters designate corresponding parts, the construction consists of a hub portion formed of two side plates, or housing members 5 and 6 which are disposed against the rim portion 9 of the wheel, as shown. The two hub members or side plates 5 and 6 are secured to the wheel rim by the series of pairs of bolts 10 screwed into threaded sleeves 11 that serve as spacing elements and which are located within the spaces, or chambers 12 formed in the rim portion 9 as indicated. It will be understood, of course, that said spaces 12 are provided to allow the wheel rim to have limited radial movement with respect to the axis 13 of the wheel. The two side plates 5 and 6 are secured to the hub by any suitable means, e. g. by the several bolts 5ᵃ and 6ᵃ as shown.

The resilient transmission and bearing device per se consists of an inner rim portion 14 keyed to the ring 30 of the rim portion 9 and provided with a plurality of cylindrical shaped apertures adapted to receive and hold therein the several pins or bolts 15 whose respective ends 16 are cone-shaped and enter complementary formed recesses on the inner portion 17 of the side plate 6, and similar recesses formed in the flange or disc portion 18 of a collar or sleeve 19 that is splined to have axial movement on the hub portion 20 as shown. An overlying or reinforcing plate 21 is secured to said side plate portion 17 and is formed with cone-shaped recesses 22 immediately overlying the corresponding recesses of the plate 17.

The inner edge portion 23 of the rim part 14 is beveled and adapted to cooperate with the angular face or cone portion 24 formed on the disc 18. The rim therefore acts with a triple cam action, to wit, elements 16 and 17, elements 16 and 18, and elements 23 and 24, all co-operating to effect a combined resilient bearing and transmission between the hub and rim portions of the wheel.

The disc portion 18 of the collar 19 is held in close contact with the several pins 15 of the rim 14 by the spring 25, and through the tension of this spring the several cone elements are held in co-operative relation and under the required tension.

An adjustable collar 26, screw-threaded on the hub portion 20, serves for regulating the tension on said spring and the removable closure plate 27 readily permits of access for adjusting said collar 26 as will be understood.

It will therefore be seen from the foregoing that any motion or shock of the shaft or axle will transmit a like movement to the wheel hub through the medium of the co-acting cones, and that such transmission will be flexible or resilient in nature. And it will be further seen that any jarring motion imparted to the wheel will be resiliently taken up by the co-operating cone elements together with the spring.

The invention is not to be understood as being limited to the details of construction herein shown and described, as these may be varied widely without departing from the spirit of the invention.

Having thus described my invention, what I claim as new is:

1. In a combined resilient transmission and bearing for vehicle wheels the combination of a hub portion, a wheel rim mounted to have limited radial movement thereon, a plurality of members having wedge elements mounted on the wheel rim, fixed and movable wedge elements on the hub co-operable with said rim wedge elements, and resilient means normally holding said wedge elements in co-operative relation, substantially as set forth.

2. In a combined resilient transmission and bearing for vehicle wheels the combination of a hub portion, a wheel rim mounted to have limited radial movement thereon, a plurality of members having wedge elements mounted on the wheel rim, and axially movable therein, fixed and movable wedge elements on the hub co-operable with said rim wedge elements, and resilient means normally holding said wedge elements in co-operative relation, substantially as set forth.

3. In a combined resilient transmission and bearing for vehicle wheels the combination of a hub portion, a wheel rim mounted to have limited radial movement thereon, a plurality of members having wedge elements on their respective ends carried by the inner rim portion and axially movable therein, fixed and movable wedge elements mounted on the hub and co-operable with the wedge elements of said axially movable members, and resilient means normally holding said wedge elements in co-operative relation, substantially as set forth.

4. In a combined resilient transmission and bearing for vehicle wheels the combination of a hub portion, a wheel rim mounted to have limited radial movement thereon, a plurality of members carried by the inner rim portion and axially movable therein, said axially movable members having cone portions on their respective ends; cone elements formed on the hub portion co-operable with the cone ends of said axially movable members on one side of the wheel, a disc axially movable on the hub and having cone elements co-operable with the cone ends of said members on the opposite side of the wheel, and resilient means normally holding said cone elements in co-operative relation, substantially as set forth.

5. In a combined resilient transmission and bearing for vehicle wheels the combination of a hub portion, a wheel rim mounted to have limited radial movement thereon, a plurality of axially movable wedge elements mounted on the wheel rim, wedge elements on the hub co-operable with said axially movable wedge elements, means holding said wedge elements in co-operative relation, and supplemental and co-operative wedge elements between said means and the wheel rim, substantially as set forth.

6. In a combined resilient transmission and bearing for vehicle wheels the combination of a hub portion, a wheel rim mounted to have limited radial movement thereon, a plurality of axially movable wedge elements mounted on the wheel rim, wedge elements on the hub co-operable with said axially movable wedge elements, a spring-tensioned disc holding said wedge elements in co-operative relation, and co-operative wedge elements formed on said disc and the wheel rim, respectively, substantially as set forth.

7. In a combined resilient transmission and bearing for vehicle wheels the combination of a hub portion, a wheel rim mounted to have limited radial movement thereon, a plurality of axially movable members mounted on the wheel rim, said members having cone elements on their respective ends; cone elements on the hub co-operable with the cone ends of said members on one side of the wheel, a disc axially movable on the hub and having cone elements co-operable with said axially movable cone elements on the opposite side of the wheel, co-operable wedge elements formed on said rim portion and disc respectively, and resilient means normally holding said cone and wedge elements in co-operative relation, substantially as set forth.

8. In a combined resilient transmission and bearing for vehicle wheels the combination of a hub portion having side plates, a wheel rim mounted to have limited radial movement between the side plates; a plurality of axially movable members carried by the inner rim portion, each of said movable members having cone-shaped ends; cone elements formed on one of the side plates and co-operable with the cone ends of said movable members on one side of the wheel, a disc axially movable on the hub and having cone elements co-operable with the cone ends of said movable members on the opposite side of the wheel; said disc and rim portion formed with co-operable wedge elements; and resilient means normally holding said cone and wedge elements in co-operative relation, substantially as set forth.

In testimony whereof I affix my signature.

BENJAMIN F. SEYMOUR.